May 24, 1938.  J. T. BLACK  2,118,290
PRESSURE REDUCING DEVICE
Filed Dec. 26, 1935
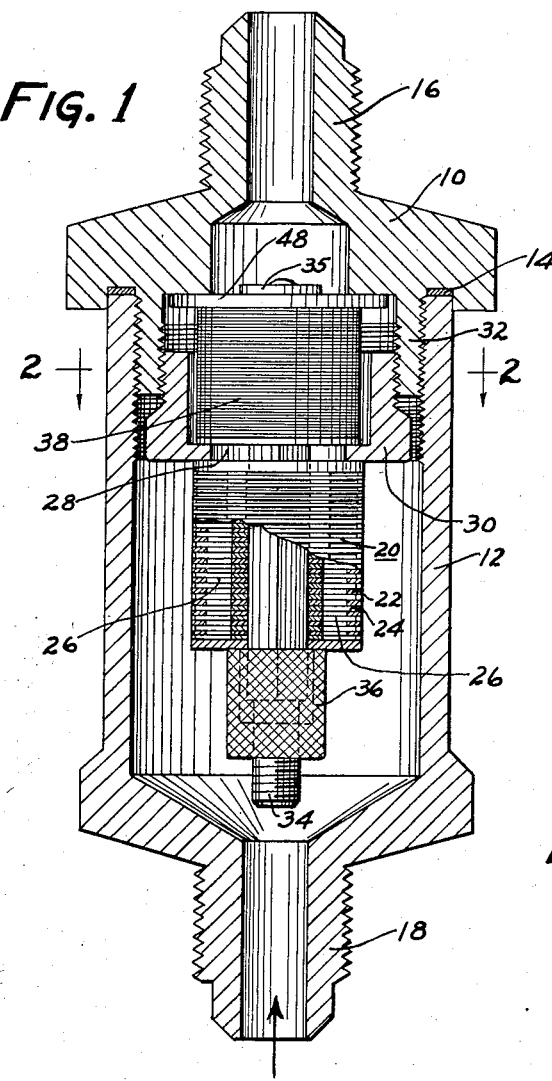
FIG. 1
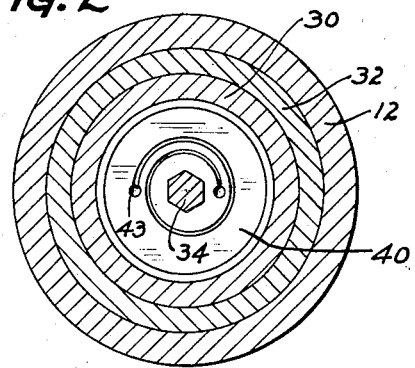
FIG. 2
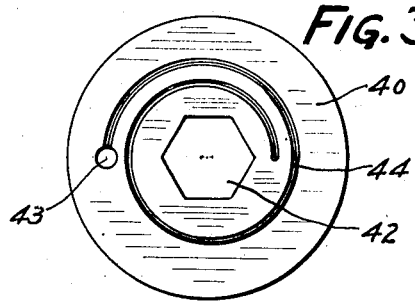
FIG. 3
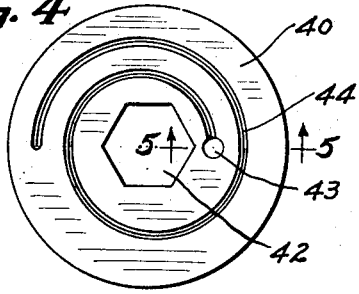
FIG. 4
FIG. 5
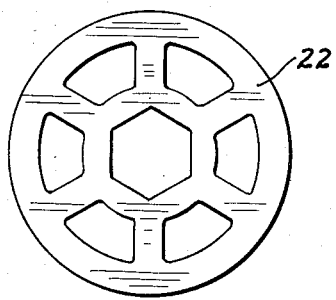
FIG. 6
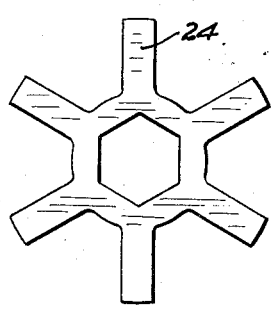
FIG. 7
INVENTOR.
JAY T. BLACK.
BY A. R. McCrady
ATTORNEY.

Patented May 24, 1938

2,118,290

UNITED STATES PATENT OFFICE 2,118,290

PRESSURE REDUCING DEVICE

Jay T. Black, Detroit, Mich., assignor to Zenith Carburetor Company, Detroit, Mich., a corporation of Michigan Application December 26, 1935, Serial No. 56,223

4 Claims. (Cl. 138—42)

This invention relates to a device for reducing the pressure of a fluid by passing the same through a restricted passage.

In numerous types of mechanisms, such as mechanical refrigerators, chemical apparatus, etc., it is necessary to reduce the pressure of a gas or a liquid, and this may be done by passing it through a restricted orifice inserted in the conduit which carries the gas or liquid.

The present invention comprises a tortuous passage of restricted cross-section, through which the fluid may pass, its movement therethrough being retarded by its friction against the walls of the passage.

An object of the invention is to produce an improved pressure reducing device which is cheap and simple to manufacture, and which may be readily assembled and disassembled, as for cleaning or repair.

A further object of the invention is to produce a pressure reducing device which is simple and dependable in action and not likely to get out of order.

Further objects and advantages of the invention will be apparent from the following description, taken in connection with the appended drawing, in which:

Figure 1 is a longitudinal section through a device embodying the invention;

Figure 2 is a horizontal cross section taken on the line 2—2 of Figure 1;

Figures 3 and 4 are enlarged views of two of the disks forming part of the pressure reducing unit, showing their angular relation to each other when assembled;

Figure 5 is an enlarged fragmentary sectional view taken on the line 5—5 of Figure 4; and Figures 6 and 7 show plates which may be used to make up the filter unit.

Referring specifically to the drawing, the device shown in Figure 1 comprises an outer casing made up of an upper portion 10 and a lower portion 12, held in fluid-tight relation to each other by interengaging threads, and sealed by a gasket 14. The upper and lower portions are provided with threaded nipples 16, 18, to allow the device to be connected in the fluid line in the usual manner.

The filtering and pressure reducing assembly is designed to be completely assembled before being inserted in the casing. The filtering unit 20 may be of the type disclosed in Heftler Patent No. 1,641,485, wherein fluid flows, preferably inwardly, through the spaces between a series of superposed laminae indicated at 22 and 24 in Figures 6 and 7, to a series of vertical conduits 26 which are arranged to register with holes 28 formed in a metallic cup 30. Cup 30 is threaded into a depending flange 32 formed on upper portion 10. A stem 34, of hexagonal or other non-circular cross-section, extends centrally through the assembly to maintain the laminae in proper position relative to each other, and is provided with a head 35 at its upper end and a knurled nut 36 at its lower end. The pressure reducing unit proper is denoted by the numeral 38, and comprises a series of superposed disks 40, each having a non-circular hole 42 at its center to receive the stem 34. Disks 40 may be readily formed by stamping.

Each of the disks 40 is provided with an aperture 43 to permit passage of fluid therethrough. A spiral groove 44 leads from this aperture one-and-one-half times around the disk, terminating at the opposite side of the hole 42. The groove 44 may be formed by stamping or indenting the disk, either when forming the disk or in a separate operation. It will be noted that the disks shown in Figures 3 and 4 are identical except that the apertures 43 are at opposite ends of the grooves 44. The disks are assembled in alternate relation, so that the aperture 43 of each disk registers with the unapertured end of the groove of the next adjacent disk. If, therefore, the disks are placed with their grooves upward, in the embodiment shown, the flow will in all cases be from the aperture 43 to the unapertured end of the groove. The opposite arrangement may be used, that just described being given merely by way of example. In any arrangement, the fluid passes through the restricted passages formed by the groove of one disk and the plain surface of the adjacent disk, then passes through an aperture 43 to the next groove, and so on until the entire unit 38 has been traversed. During its passage, the pressure of the fluid is reduced by the friction of the fluid against the walls of the passages.

The fluid, flowing upwardly from nipple 18, thus first passes through the filter 20, thence through holes 28 to the slot in the lowermost disk of unit 38, thence through unit 38 and out nipple 16. A washer 48 at the top of the unit 38 holds the disks in their assembled relation and is apertured after the manner of the lamina shown in Figure 6 to permit the fluid to flow through it.

It will be understood that the functioning of the device is independent of the position in which it may be placed, so that the terms "upper", "lower", etc. should be interpreted accordingly. It will also be understood that the flow through the device may be in the reverse direction if desired, although the arrangement shown in Figure 1 is preferred.

I claim:

1. A pressure reducing unit comprising a series of stampings directly superposed in indexed relation and compressed to prevent passage of fluid therebetween, each stamping being formed with an arcuate groove communicating with the groove of the next adjacent stamping, and a member extending centrally through said stampings to maintain them in assembled and indexed relation.

2. A pressure reducing unit comprising a series of plates superposed upon each other with their plane surfaces contacting, each plate being formed with an arcuate groove terminating in a perforation extending through the plate and communicating with the groove of the next plate, and with a central non-circular aperture, and a member extending through the apertures to maintain the plates in indexed relation.

3. A pressure reducing unit comprising a pile of disks directly superposed upon each other with their plane surfaces in liquid-tight contact, each disk being provided with a central indexing aperture and being formed on one surface only with an arcuate groove terminating in a perforation extending through the disk and communicating with the groove of the next adjacent disk, the perforations of alternate disks being disposed nearer to the central aperture than the perforations of the other disks.

4. A pressure reducing unit comprising a stack of plates directly superposed with their plane faces in liquid-tight contact, each plate being provided with a central indexing aperture and being formed upon one face only with a restricted groove terminating in a perforation extending through the plate and communicating with the groove of the next plate, and means extending through the indexing aperture for compresing the stack and maintaining the plates in assembled and indexed relation.

JAY T. BLACK.